US012265478B2

(12) United States Patent
Segev et al.

(10) Patent No.: US 12,265,478 B2
(45) Date of Patent: Apr. 1, 2025

(54) ACCELERATED ENCRYPTION DURING POWER LOSS

(71) Applicant: Western Digital Technologies, Inc., San Jose, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 211 days.

(21) Appl. No.: 17/870,395

(22) Filed: Jul. 21, 2022

(65) Prior Publication Data

US 2024/0028524 A1    Jan. 25, 2024

(51) Int. Cl.
| H04L 29/00 | (2006.01) |
| G06F 1/3225 | (2019.01) |
| G06F 12/0882 | (2016.01) |
| G06F 12/14 | (2006.01) |

(52) U.S. Cl.
CPC ........ *G06F 12/1408* (2013.01); *G06F 1/3225* (2013.01); *G06F 12/0882* (2013.01)

(58) Field of Classification Search
CPC . G06F 12/1408; G06F 1/3225; G06F 12/0882
USPC ......................................................... 713/193
See application file for complete search history.

(56) References Cited

U.S. PATENT DOCUMENTS

| 9,176,896 | B2 * | 11/2015 | Baryudin | ............ G06F 12/1408 |
| 9,294,887 | B2 * | 3/2016 | Song | ..................... H04L 12/189 |
| 9,305,610 | B2 | 4/2016 | Smith et al. | |
| 9,836,108 | B2 | 12/2017 | Kojima et al. | |
| 10,318,417 | B2 | 6/2019 | Lu et al. | |
| 11,070,375 | B2 | 7/2021 | Eckel et al. | |
| 2010/0235678 | A1* | 9/2010 | Kompella | ........... G06F 11/1441 |
| | | | | 714/48 |
| 2011/0202728 | A1 | 8/2011 | Nichols et al. | |
| 2012/0151253 | A1 | 6/2012 | Horn | |
| 2014/0189234 | A1 | 7/2014 | Tang et al. | |
| 2014/0304454 | A1* | 10/2014 | Ellis | ................... G06F 11/1441 |
| | | | | 711/118 |
| 2017/0199684 | A1 | 7/2017 | Alavi | |
| 2020/0117397 | A1 | 4/2020 | Li et al. | |

* cited by examiner

*Primary Examiner* — Jeffrey C Pwu
*Assistant Examiner* — Michael D Anderson
(74) *Attorney, Agent, or Firm* — PATTERSON + SHERIDAN, LLP (57) ABSTRACT

The present disclosure generally relates to a XTS cache operation during a power down event. Upon detection of power loss, data that is waiting to be encrypted needs to be flushed to the memory device. For any unaligned data or data less than a flash management unit (FMU) size, the data is grouped together and, if necessary, padded to reach the FMU size and then encrypted, merged with other data FMUs, and written to the memory device. Grouping the unaligned data reduces the amount of padding necessary to reach FMU size and also reduces the amount of data to be encrypted. As such, data flushing can be accomplished using the limited amount of remaining power during the power loss event.

20 Claims, 8 Drawing Sheets

ACCELERATED ENCRYPTION DURING POWER LOSS

BACKGROUND OF THE DISCLOSURE

Field of the Disclosure

Embodiments of the present disclosure generally relate to a XTS cache operation during a power down event.

Description of the Related Art

During a power loss event, any data that is stored in cache needs to be written to the memory device in a process oftentimes referred to as flushing data. A backup power supply, such as a capacitor, is used to provide power to the data storage device once the external power supply is lost. The capacitor has a limited amount of power to be used, and flushing data is one of several processes that should occur during a power loss event.

In order to flush data, the data that is in cache is gathered, encrypted, and written to the memory device. The data should be aligned when written to the memory device, but oftentimes, the data in cache is not aligned. In such a scenario, the unaligned data is padded with dummy data as placeholder data to fill in the locations of the data that would normally complete the alignment to reach a flash management unit (FMU) size. The data is then encrypted and eventually written to the memory device. Unfortunately, the unaligned data may span multiple FMUs such that multiple FMUs need to be padded and encrypted. Encrypting an FMU takes time, and there is precious little time in a power loss event, and little power to spread around to ensure completion of the multiple operations that occur during the power loss event.

Therefore, there is a need in the art for efficient data flushing during a power loss event.

SUMMARY OF THE DISCLOSURE

The present disclosure generally relates to a XTS cache operation during a power down event. Upon detection of power loss, data that is waiting to be encrypted needs to be flushed to the memory device. For any unaligned data or data less than a flash management unit (FMU) size, the data is grouped together and, if necessary, padded to reach the FMU size and then encrypted, merged with other data FMUs, and written to the memory device. Grouping the unaligned data reduces the amount of padding necessary to reach FMU size and also reduces the amount of data to be encrypted. As such, data flushing can be accomplished using the limited amount of remaining power during the power loss event.

In one embodiment, a data storage device comprises: a memory device; and a controller coupled to the memory device, wherein the controller is configured to: determine that a first cache contains data; determine that at least some data in the first cache is unaligned; combine the unaligned first cache data; and send the combined unaligned first cache data to the memory device.

In another embodiment, a data storage device comprises: a memory device; and a controller coupled to the memory device, wherein the controller is configured to: detect power up has occurred; check memory device for data stored using the pFail key; read data from the memory device associated with the pFail key, wherein the read data is unaligned; and place the unaligned read data in a first cache.

In another embodiment, a data storage device comprises: memory means; and a controller coupled to the memory means, wherein the controller is configured to: combine non-consecutive logical block address (LBA) data that is stored in a cache into a grouping of data, wherein the cache is distinct from the memory means; and store the grouping of data in the memory means, wherein the combining and storing is in response to a power failure event.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a XTS cache operation during a power down event. Upon detection of power loss, data that is waiting to be encrypted needs to be flushed to the memory device. For any unaligned data or data less than a flash management unit (FMU) size, the data is grouped together and, if necessary, padded to reach the FMU size and then encrypted, merged with other data FMUs, and written to the memory device. Grouping the unaligned data reduces the amount of padding necessary to reach FMU size and also reduces the amount of data to be encrypted. As such, data flushing can be accomplished using the limited amount of remaining power during the power loss event.

Figure 1:
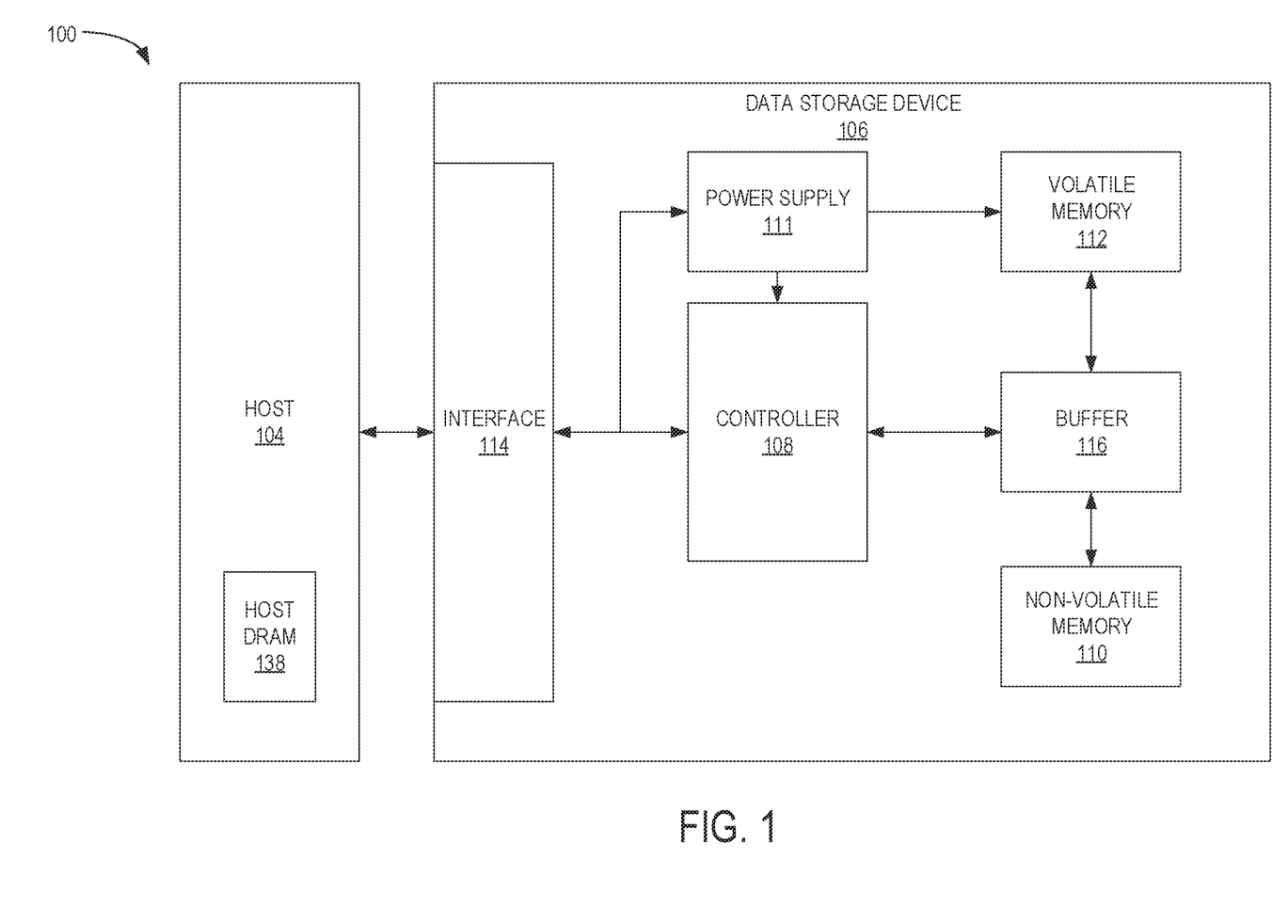
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory 150), which may be SRAM memory, prior to sending the data to the NVM 110.

Figure 2:
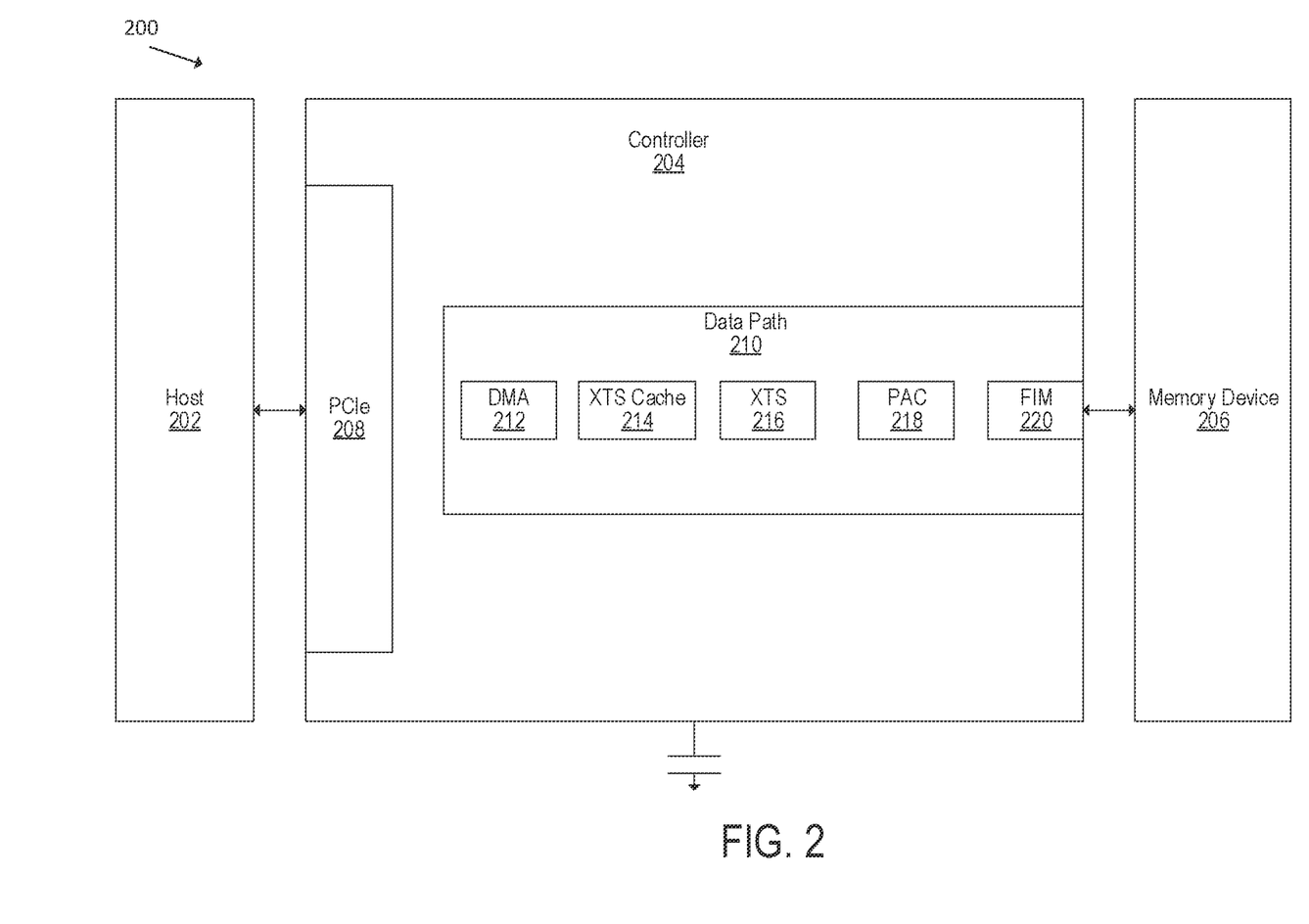
FIG. 2 is a schematic illustration of a solid state device (SSD) system according to one embodiment.

FIG. 2 is a schematic illustration of a solid state device (SSD) system 200 according to one embodiment. Data from the host 202 is transferred by using a PCIe transport layer 208. The direct memory access (DMA) 212 reads the data from the host 202. The data is stored temporarily in the XTS cache 214 before encryption at XTS 216. The encrypted data is then stored temporarily in the page align cache (PAC) 218. The flash interface module (FIM) 220 then writes encrypted data to the memory device 206. The SSD system 200 comprises of an external capacitor. One function of the external capacitor is to store sufficient power to allow the SSD system 200 to clear the entire XTS cache 214 and PAC 218 during a power-failure event.

In certain embodiments, the controller 204 utilizes the XTS cache 214 and the PAC 218 during the write command flow. The XTS cache 214 and the PAC 218 are used for at least two functions. A first function is to receive the data and allow the SSD system 200 to send a completion notification even before data is sent to the memory device 206. A second function is to allow the controller 204 to align the data to the memory device 206.

In one embodiment, the memory device 206 comprises, for example, NAND flash memory, and contains at least two regions. One region comprises of single-level cell (SLC) memory where a single bit is stored per cell. Another region comprises of quad-level cell (QLC) memory where multiple bits are stored per cell. To increase storage capacity, the target destination of the data is QLC memory because an SLC page has granularity of 16 KB versus a QLC page which has granularity of 32 KB or more if more bits per cell are used.

The optimal 'unit' size when working from a NAND perspective is page size, which is around 32K. The SSD system 200 needs to add metadata to the 32K user data to ensure correct behavior. The metadata can include error correction codes (ECCs) and other control and status information. However, most operating systems in a host 202 work in 4K+ or 512 byte granularity. Even with 512 byte granularity, performance requirements have a 4K granularity. The host 202 accomplishes optimal 'unit' size by using a multiple of 8 LBAs per command to reach 4K alignment.

Secured devices require that all data is encrypted in the memory device 206. Data going through the security engine cannot be protected against bit flipping by parity or error correction code (ECC), as such, the entire un-encrypted data is padded with a cyclical redundancy check (CRC), which is also encrypted. This protection from CRC increases the size of the payload. Even with the increased payload size, the generation of the required keys for the encryption introduce more delays, and as such, impact performance. Because of the extra payload from CRC and the delays from generating keys, the system only encrypts at 4K granularity to minimize the two effects.

Figure 3A:
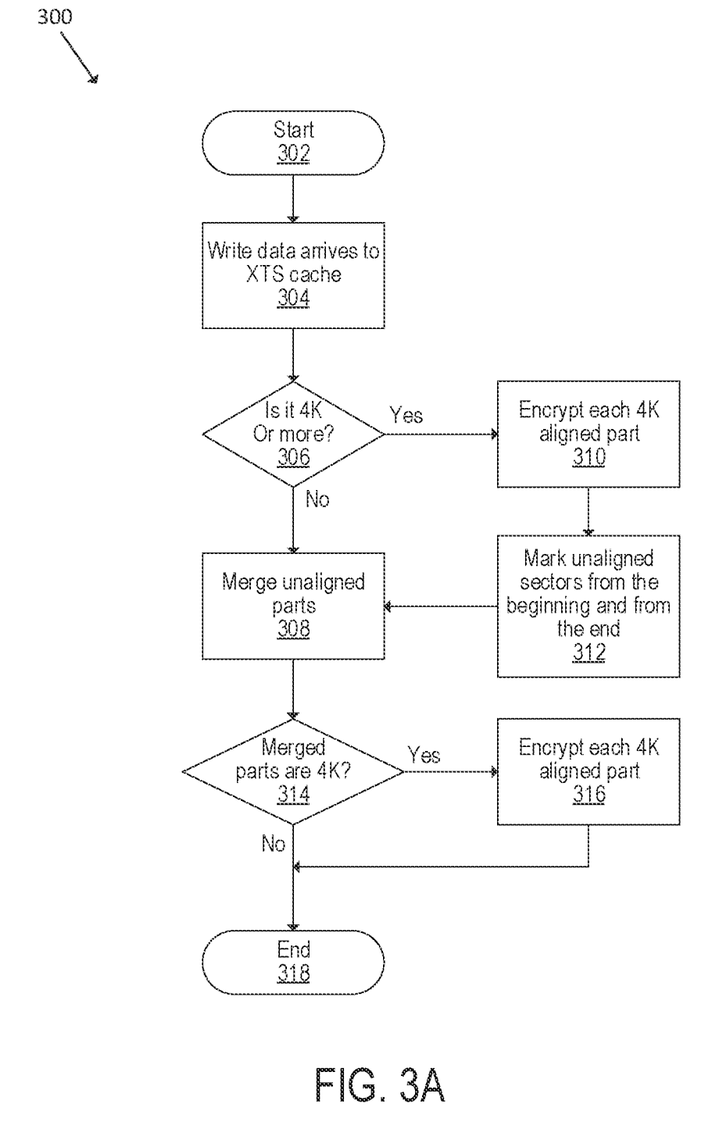
FIG. 3A is a flowchart illustrating a cache extraction operation according to one embodiment.

FIG. 3A is flowchart 300 illustrating a cache extraction operation according to one embodiment. For ease of description, the cache extraction operation is described in reference to the SSD system 200 although any suitable system may be used.

After starting at block 302, at block 304, the data storage device waits to write data from the host 202 into the XTS cache 214.

At decision block 306, the controller 204 determines if the data in the XTS cache 214 is 4K or greater. If the data is 4K or greater, any fully 4K aligned data is encrypted at block 310. The controller continues by then marking any unaligned sectors from the beginning and from the end at block 312.

After the unaligned sectors are marked at block 312 or if the controller determines the data in the XTS cache 214 is not 4K or greater at decision block 306, the controller merges any unaligned LBAs at block 308.

At decision block 314, the controller then determines if the merged data has reached 4K alignment. If the data is 4K aligned, then at block 316 the data is encrypted. Any merged data that does not reach 4K alignment remains in the XTS cache and the flow ends at block 318.

Figure 3B:
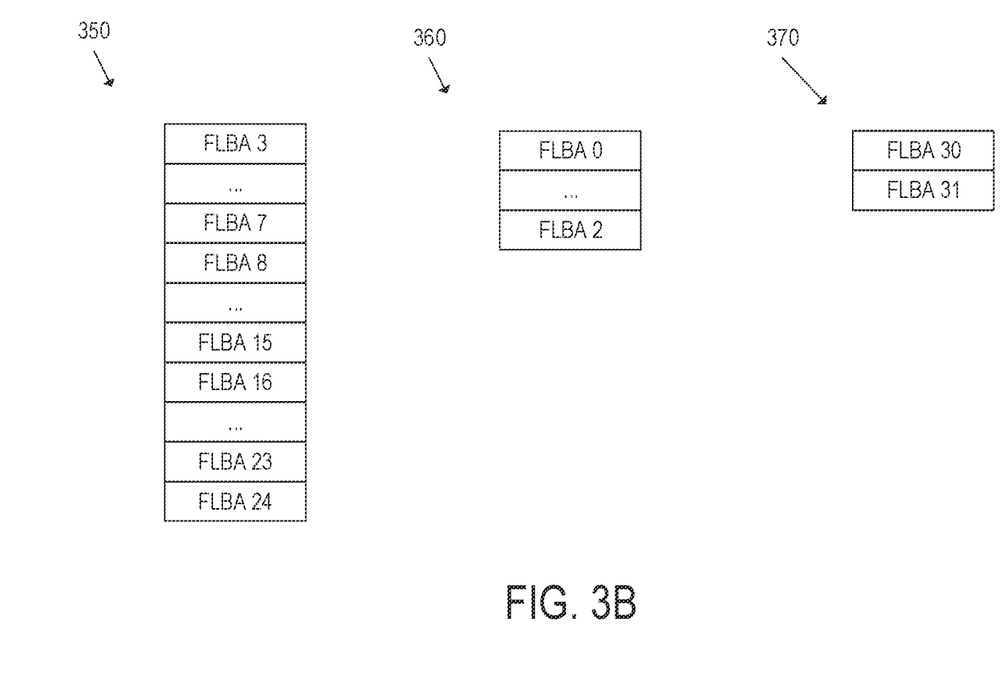
FIG. 3B is a schematic illustration of commands processed during the cache extraction operation of FIG. 3A.

FIG. 3B is a schematic illustration of commands 350, 360, 370 processed during the cache extraction operation of FIG. 3A. For ease of description, the cache extraction operation is described in reference to the SSD system 200 although any suitable data storage device may be used.

The first command 350 is comprised of logical block addresses (LBAs) 3 to 24. Each LBA is equal to 512 bytes, and as such, LBAs 8-15, and LBAs 16-23 each represent a full 4K aligned unit. LBAs 8-15 and LBAs 16-23 are sent to the XTS 216 leaving the XTS cache 214 with LBAs 3, 4, 5, 6, 7 and 24.

The second command 360 is comprised of LBAs 0-2. These LBAs are sent to the XTS cache 214 where they are merged with LBAs 3-7 to form a consecutive 4K aligned unit and sent to the XTS 216. LBA 24 remains in the XTS cache 214.

The third command 370 is comprised of LBAs 30 and 31. LBA 30, LBA 31, and the previously cached LBA 24 all belong to the same consecutive 4K aligned unit but LBAs 25-29 are not in the cache so the unit is not sent to the XTS 216. This results in leaving LBAs 24, 30, and 31 in the XTS cache 214.

When a power failure is detected, everything needs to be flushed into the memory device 206 as fast as possible, while the capacitor still provides enough power to do so. To do this, LBAs 24, 30, and 31 are padded with dummy data for LBAs 25-30 to reach 4K alignment. The 4K aligned unit is sent to the XTS 216 to be encrypted. After the XTS 216, the aligned unit is padded again, if needed, to reach 32K alignment and is written to the memory device 206.

Figure 4:
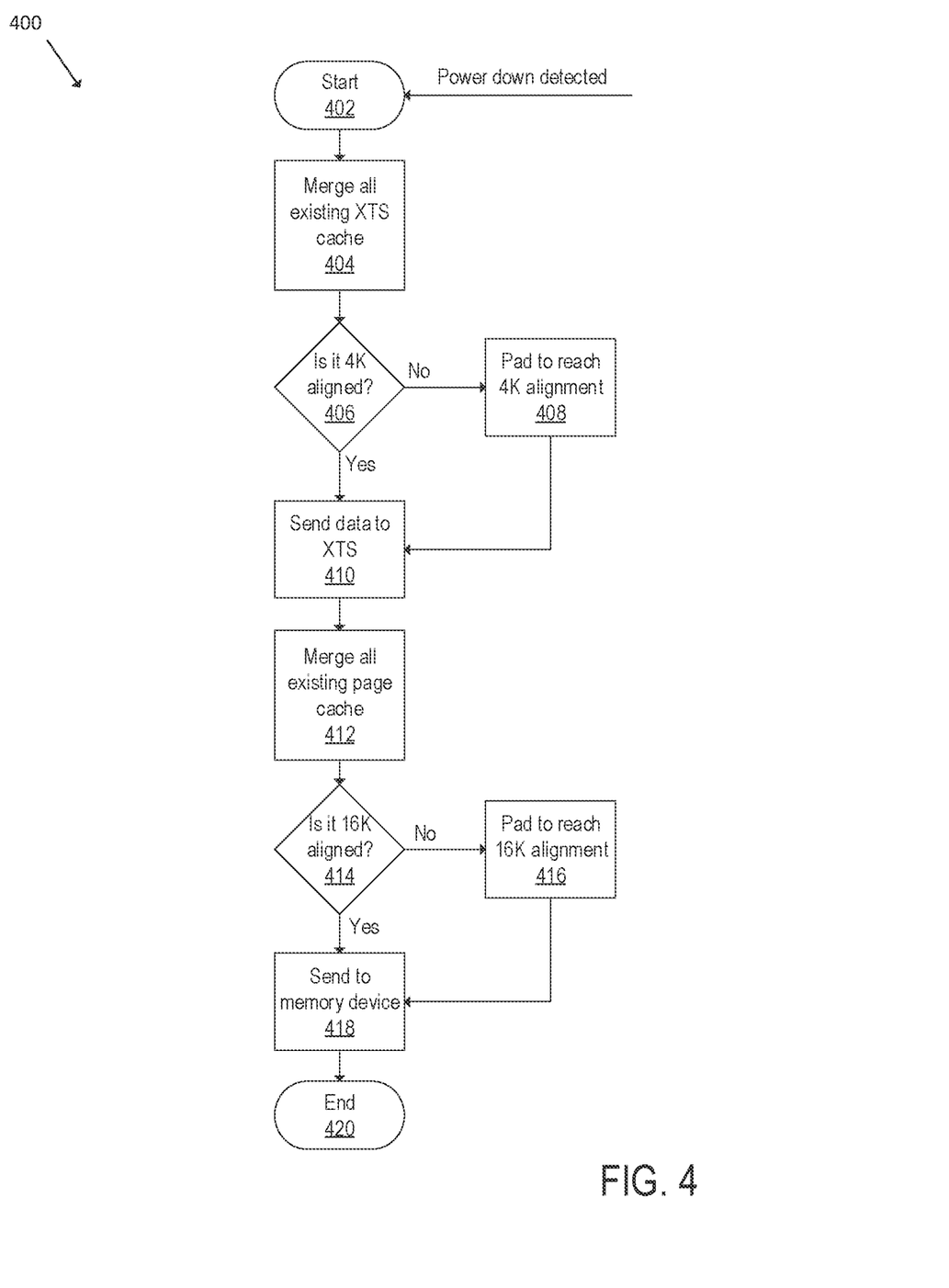
FIG. 4 is a flowchart illustrating a power down cache extraction operation according to one embodiment.

FIG. 4 is a flowchart 400 illustrating a power down cache extraction operation according to one embodiment. For ease of description, the power down cache extraction operation is described in reference to the SSD system 200 although any suitable data storage device may be used.

The process starts at block 402. At block 404, the controller merges any LBAs in the XTS cache 214. The controller does not check for consecutive groupings for the LBAs.

At decision block 406, the controller checks if the merged LBAs have reached 4K alignment. If the merged LBAs have reached 4K alignment, the flow continues to block 410. If the merged LBAs are not 4K aligned, the flow proceeds to block 408.

With block 408, the merged LBAs are padded with dummy data to reach the needed 4K alignment for encryption. This results in only 4K aligned LBAs remaining in the XTS cache 214.

At block 410, the controller sends all 4K aligned data in the XTS cache 214 to the XTS 216 to be encrypted. All of the data uses the same device internal pFail key for encryption. The pFail key is already prepared and thus does not increase latency. After the 4K aligned data has been encrypted with the pFail key, the data is sent to the PAC 218.

Then, at block 412 all data existing in the PAC 218 is merged to reach 16K alignment. Then at decision block 414, the controller determines if all merged data is 16K aligned or not. If merged data is not 16K aligned, the flow moves to block 416.

At block 416, the merged data that is not 16K aligned are padded with dummy data. As data is not stored in the destination, a temporary one bit per cell is sufficient.

Finally at block 418, all 16K aligned data in the PAC 218 is sent to the memory device 206 to be written before total power loss.

Figure 5:
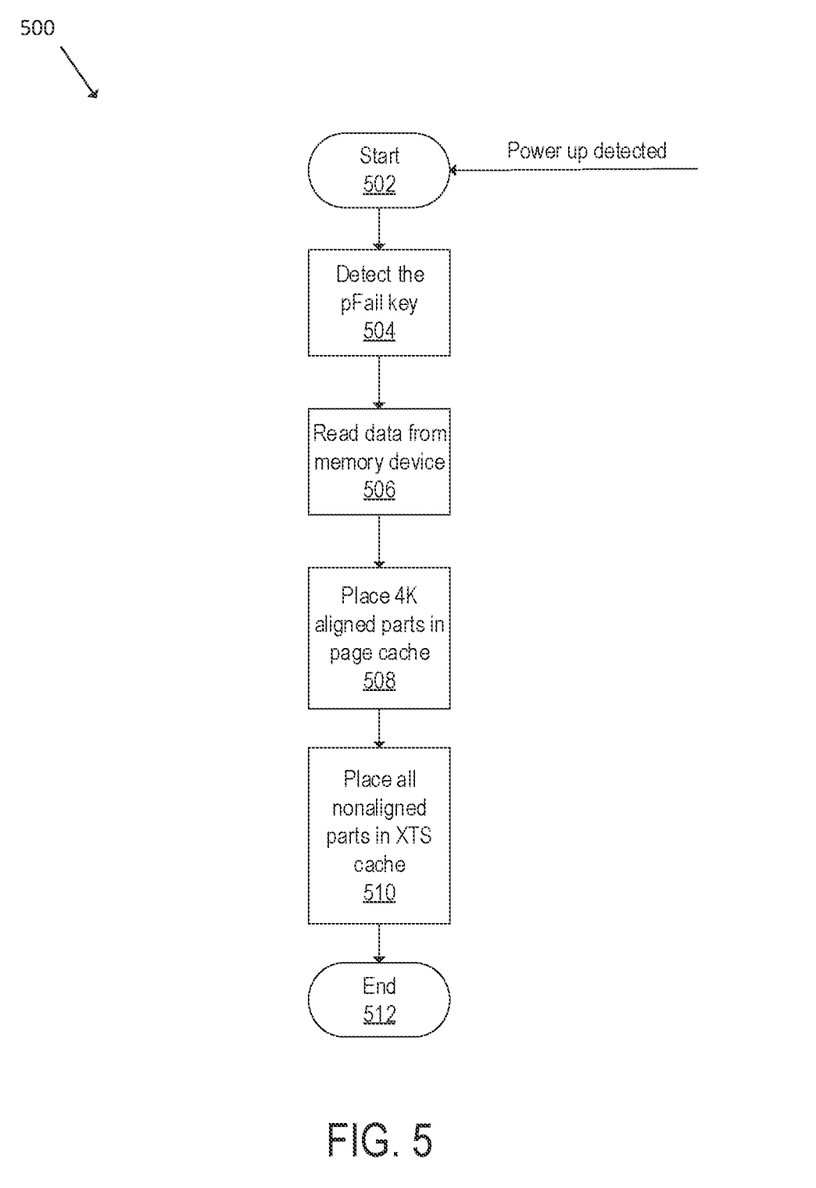
FIG. 5 is a flowchart illustrating a power up operation after a power down cache extraction operation according to one embodiment.

FIG. 5 is a flowchart 500 illustrating a power up operation after a power down cache extraction operation according to one embodiment. For ease of description, the power up operation is described in reference to the SSD system 200 although any suitable data storage device may be used.

The process starts at block 502. When power is restored, the flow proceeds to block 504 where the controller detects the existence of the pFail key. The data that was stored earlier using the pFail key to the memory device 206 during the power down cache extraction operation is then read from the memory device 206 at block 506.

The data that is read back from the memory device 206 is checked for 4K alignment and any data found to be 4K aligned are placed in the PAC 218 at block 508. Unaligned data that is read back from the memory device 206 is placed back in the XTS cache 214 at block 510. The flow ends at block 512 once all data that was written to the memory device 206 during the power down cache extraction operation has been read back from memory into the XTS cache 214 and the PAC 218.

Figure 6:
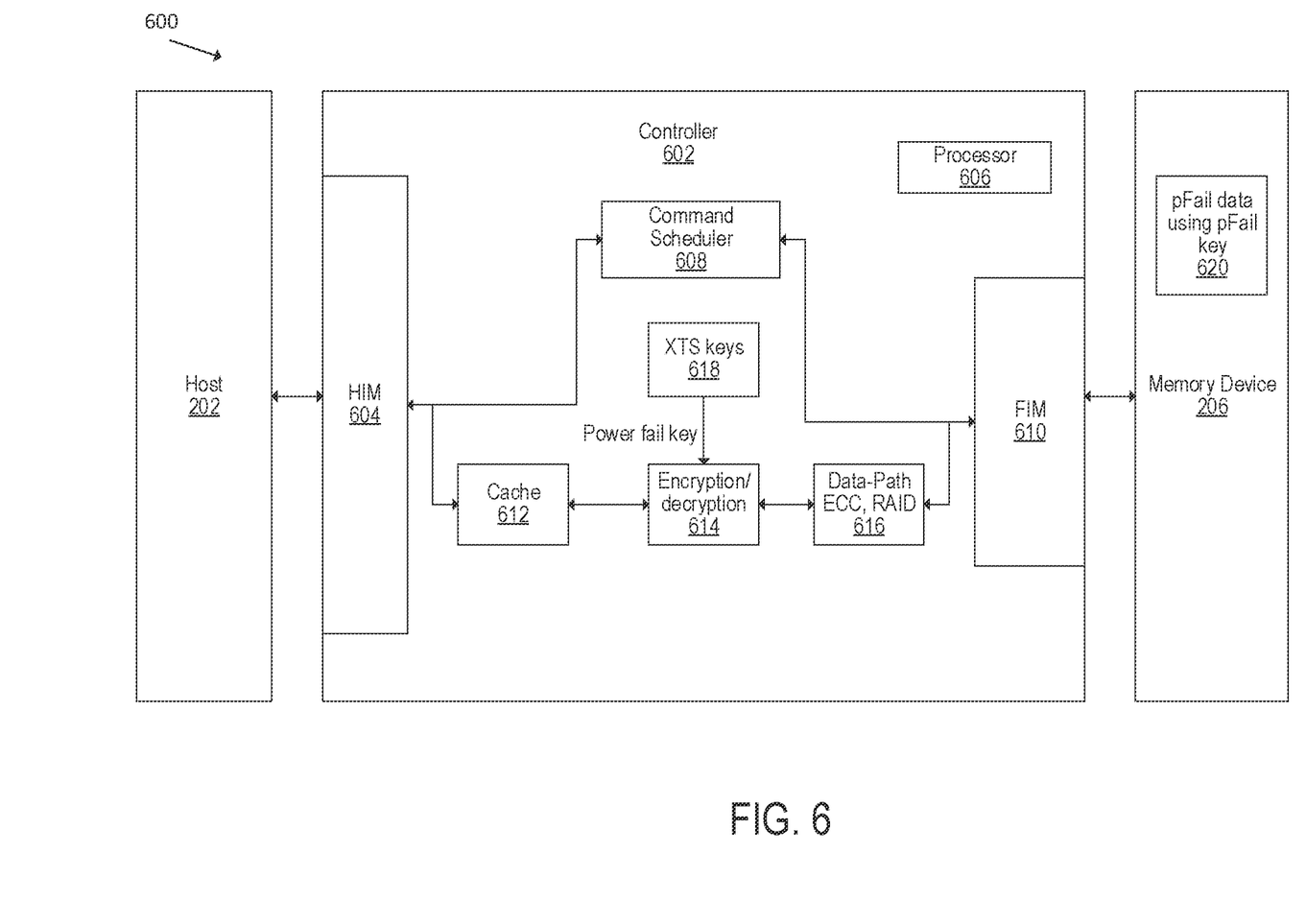
FIG. 6 is a schematic illustration of a memory system according to one embodiment.

FIG. 6 is a schematic illustration of a memory system 600 according to one embodiment. Data from the host 202 is transferred to the controller 602 by using a host interface module (HIM) 604. The controller 602 contains internal processor 606. From the HIM 604, data is sent both to a command scheduler 608 and a cache 612. The command scheduler 608 tracks read and write operations of the system. The cache 612 acts as a buffer for the encryption/decryption engine 614. Once data has been encrypted, the data is sent to data-path ECC, RAID 616 before being sent to the FIM 610 to transfer the data to the memory device 206.

The XTS keys 618 holds a table of dedicated keys, including one key for power failure scenarios. In those scenarios, the power failure key is used to speed up the flush process while using the power provided by a capacitor. Without the pFail key, the device might be required to fetch the real encryption key from the memory device 206, causing further delay and power consumption.

The data that is encrypted and stored during power down can be identified from the pFail encryption. Any data that was encrypted with the pFail key can be identified as pFail data 620. The pFail data 620 is stored in the memory device 206 before power is recovered and the data may be restored to the data's condition prior to power loss.

By allowing the controller to store data in SLC range with an internal pFail key, the time required to go into power down is greatly reduced. The main advantage of reducing the time required is the required capacitor may be smaller and therefore reduce the bill of materials.

Figure 7:
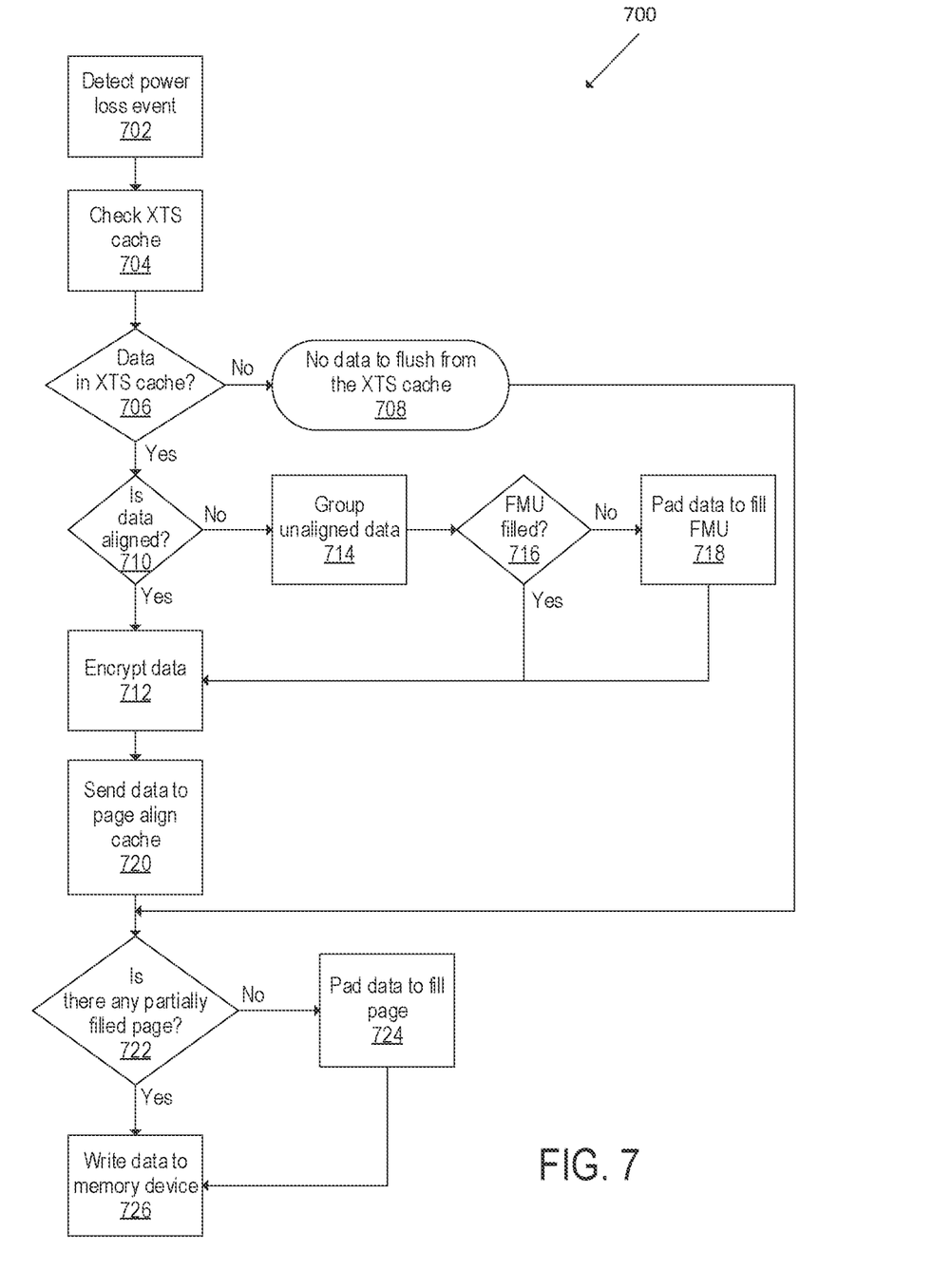
FIG. 7 is a schematic illustration of a power down cache extraction operation according to another embodiment.

FIG. 7 is a flowchart 700 of a power down cache extraction operation according to another embodiment. For ease of description, the power down cache extraction operation is described in reference to the SSD system 200 although any suitable data storage device may be used.

The flow begins at block 702 where the controller detects a power loss event. When power loss is detected, any data remaining in volatile memory needs to be flushed and written to nonvolatile memory to prevent data loss.

At block 704, the controller checks the XTS cache 214 to see if there is data remaining that needs to be flushed. If there is no data in the XTS cache 214 at block 706, then there is no data to flush from the XTS cache at block 708 and the flow continues to block 722 to check for data in the PAC 218 to flush.

If there is data found in the XTS cache 214 at block 706 then the flow proceeds to decision block 710 to check if the data is a 4K aligned flash management unit (FMU). If the data found in the XTS cache 214 is 4K aligned then the 4K FMU is sent to the XTS 216 engine to be encrypted at block 712. If the data is not 4K aligned, the flow continues to block 714.

At block 714, the unaligned data is grouped together, disregarding any typical requirement for consecutive LBAs in order to rapidly form as few 4K aligned FMUs to be encrypted during a power loss event. The aim is to reduce the number of encryptions required to reduce total power and time required for power down.

At decision block 716, the controller determines if any FMUs in the XTS cache 214 are filled to reach 4K alignment. Any 4K aligned FMUs are sent to be encrypted at block 712, while any FMUs that are still not 4K are padded with dummy data at block 718 and then sent to be encrypted at block 712.

The encryption occurring at block 712 is carried out with a single pFail key for all FMUs that need to be encrypted during power down. The use of a single pre-generated key eliminates the need to generate or read regular encryption keys from the memory device 206 which takes valuable time.

Next, the pFail encrypted FMUs are sent to the PAC 218 at block 720. At decision block 722, the controller checks to see if there is sufficient data in the PAC 218 to form a 16K aligned page. If there is sufficient data to form a 16K aligned page, then the data is grouped together and written to then memory device 206 at block 726. If there is not sufficient data, the flow continues to block 724.

At block 724, the controller pads the grouped FMUs in the PAC 218 with dummy data to reach 16K alignment. Because the padded information is unimportant, the padding only entails storing a single bit per cell to reduce time needed. The padded 16K aligned page is then written to the memory device 206 at block 726 before a full device power down.

By grouping unaligned data or data less than a flash management unit (FMU) size together, the amount of padding necessary to reach FMU size is reduced. Additionally, the amount of data to be encrypted is also reduced. As such, less power is needed for data flushing operations. Thus, a smaller capacitor may be used with reduces the bill of materials (BOM).

For example, a host may send a single command, or seven individual commands, comprising of LBAs 0, 8, 16, 24, 32, 40, and 48. Normally, none of the LBAs may be grouped together for 4K alignment as the LBAs are not consecutive LBAs. Therefore, the LBAs remain in the XTS cache. Originally, in the event of a power loss, the seven LBAs would need to be individually padded to reach 4K alignment, and all seven padded FMUs would need to be encrypted by seven unique encryption keys. With this disclosure, in the event of a power loss the seven LBAs may be grouped together, disregarding any consecutive requirement. The seven LBAs still need to be padded to reach a 4K aligned FMU, but only one LBA padding being used. Then the single FMU is sent to be encrypted with the pre-generated pFail key. In this example, rather than seven instances padding and encrypting before power failure, there is only one instance of padding and encryption, which is both faster and utilizes less power.

In one embodiment, a data storage device comprises: a memory device; and a controller coupled to the memory device, wherein the controller is configured to: determine that a first cache contains data; determine that at least some data in the first cache is unaligned; combine the unaligned first cache data; and send the combined unaligned first cache data to the memory device. The controller is further configured to detect power loss, and wherein the determining that the first cache contains data is performed in response to the detecting power loss. The controller is further configured to: determine whether the combined unaligned first cache data has a size equal to a flash management unit (FMU); and pad the combined unaligned first cache data with dummy data to form the FMU. The controller is further configured to send the combined unaligned first cache data to an encryption unit to encrypt the combined unaligned first cache data prior to sending the combined unaligned first cache data to the memory device. The controller is configured to create a pFail key for the encrypted combined unaligned first cache data. The controller is configured to identify data encrypted by the pFail key. The encryption unit is an XTS encryption unit. The controller is further configured to send the encrypted combined unaligned first cache data to a second cache. The controller is further configured to determine whether data in the second cache, when combined, matches a page size. The controller is configured to combine the encrypted combined unaligned first cache data with one or more of second cache data and dummy data to achieve the page size.

In another embodiment, a data storage device comprises: a memory device; and a controller coupled to the memory device, wherein the controller is configured to: detect power up has occurred; check memory device for data stored using the pFail key; read data from the memory device associated with the pFail key, wherein the read data is unaligned; and place the unaligned read data in a first cache. The unaligned read data is encrypted. The controller is further configured to decrypt the encrypted unaligned read data prior to placing the unaligned read data in the first cache. The controller is further configured to cache the pFail key prior to reading the data. The controller is further configured to store aligned data in a second cache. The aligned data in the second cache is encrypted. The read data includes dummy data.

In another embodiment, a data storage device comprises: memory means; and a controller coupled to the memory means, wherein the controller is configured to: combine non-consecutive logical block address (LBA) data that is stored in a cache into a grouping of data, wherein the cache is distinct from the memory means; and store the grouping of data in the memory means, wherein the combining and storing is in response to a power failure event. The controller is configured to add dummy data to the non-consecutive LBA data to create the grouping of data. The controller is further configured to: detect a power up event; and, using the pFail key, write the grouping of data to the cache.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
   determine that a first cache contains data;
   determine that at least some data in the first cache is unaligned;
   combine the unaligned first cache data;
   encrypt the combined unaligned first cache data with a pFail key, wherein the pFail key is a dedicated key for power failure scenarios used to speed up a flush process; and
   send the encrypted combined unaligned first cache data with the pFail key to the memory device.

2. The data storage device of claim 1, wherein the controller is further configured to detect power loss, and wherein the determining that the first cache contains data is performed in response to the detecting power loss.

3. The data storage device of claim 1, wherein the controller is further configured to:
   determine whether the combined unaligned first cache data has a size equal to a flash management unit (FMU); and
   pad the combined unaligned first cache data with dummy data to form the FMU.

4. The data storage device of claim 1, wherein the controller is further configured to send the combined unaligned first cache data to an encryption unit to encrypt the combined unaligned first cache data prior to sending the combined unaligned first cache data to the memory device.

5. The data storage device of claim 4, wherein the controller is configured to create the pFail key for the encrypted combined unaligned first cache data.

6. The data storage device of claim 5, wherein the controller is configured to identify data encrypted by the pFail key.

7. The data storage device of claim 4, wherein the encryption unit is an XTS encryption unit.

8. The data storage device of claim 4, wherein the controller is further configured to send the encrypted combined unaligned first cache data to a second cache.

9. The data storage device of claim 8, wherein the controller is further configured to determine whether data in the second cache, when combined, matches a page size.

10. The data storage device of claim 9, wherein the controller is configured to combine the encrypted combined unaligned first cache data with one or more of second cache data and dummy data to achieve the page size.

11. A data storage device, comprising:
a memory device; and
a controller coupled to the memory device, wherein the controller is configured to:
detect power up has occurred;
check the memory device for data stored using a pFail key, wherein the pFail key is a dedicated key for power failure scenarios used to speed up a flush process, wherein the data is encrypted with the pFail key;
read data from the memory device associated with the pFail key, wherein the read data is unaligned; and
place the unaligned read data in a first cache.

12. The data storage device of claim 11, wherein the unaligned read data is encrypted.

13. The data storage device of claim 12, wherein the controller is further configured to decrypt the encrypted unaligned read data prior to placing the unaligned read data in the first cache.

14. The data storage device of claim 11, wherein the controller is further configured to cache the pFail key prior to reading the data.

15. The data storage device of claim 11, wherein the controller is further configured to store aligned data in a second cache.

16. The data storage device of claim 15, wherein the aligned data in the second cache is encrypted.

17. The data storage device of claim 11, wherein the read data includes dummy data.

18. A data storage device, comprising:
memory means; and
a controller coupled to the memory means, wherein the controller is configured to:
combine non-consecutive logical block address (LBA) data that is stored in a cache into a grouping of data that includes a pFail key, wherein the cache is distinct from the memory means, wherein the pFail key is a dedicated key for power failure scenarios used to speed up a flush process;
encrypt the grouping of data with the pFail key; and
store the encrypted grouping of data with the pFail key in the memory means, wherein the combining and storing is in response to a power failure event.

19. The data storage device of claim 18, wherein the controller is configured to add dummy data to the non-consecutive LBA data to create the grouping of data.

20. The data storage device of claim 18, wherein the controller is configured to:
detect a power up event;
decrypt using the pFail key; and
write the grouping of data to the cache.

* * * * *